(12) United States Patent
Chowdhury (10) Patent No.: US 8,682,840 B2
(45) Date of Patent: Mar. 25, 2014

(54) REPRESENTING RELATIONSHIPS BETWEEN DATA

(75) Inventor: Sandeep Chowdhury, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/947,280

(22) Filed: Nov. 29, 2007

(65) Prior Publication Data

US 2009/0144293 A1    Jun. 4, 2009

(51) Int. Cl.
*G06F 7/00*    (2006.01)

(52) U.S. Cl.
USPC .......................................... 707/601

(58) Field of Classification Search
USPC ................................. 707/100, 601
See application file for complete search history.

(56) References Cited

U.S. PATENT DOCUMENTS

| | | | |
|---|---|---|---|
| 7,076,507 B1 | 7/2006 | Tarin | |
| 2002/0070959 A1* | 6/2002 | Rising, III | 345/723 |
| 2005/0076031 A1 | 4/2005 | Xu et al. | |
| 2006/0195459 A1* | 8/2006 | Nori et al. | 707/100 |
| 2006/0242184 A1* | 10/2006 | Shur et al. | 707/102 |
| 2006/0259458 A1* | 11/2006 | Hunter et al. | 707/2 |

OTHER PUBLICATIONS

Indexing XML Objects with Ordered Schema Trees, Laurent Yeh, Georges Gardarin, Laboratoire PRiSM, Université de Versailles Saint-Quentin.

* cited by examiner

*Primary Examiner* — Apu Mofiz
*Assistant Examiner* — Ajith Jacob
(74) *Attorney, Agent, or Firm* — Lee Law, PLLC; Christopher B. Lee (57) ABSTRACT

Establishing relationships between data instances and characteristics of the data by associating each of data instance with at least one qualifying schema node. A unique relationship ID is assigned to relationships between any two nodes of the qualifying schema which are both associated with the same data instances. The relationship IDs can be sorted and queried. The qualifying schema, at least some of which are instantiated, serves the dual purpose of qualifying the data instances as well as establishing relationships between them. Relationships between instances can be changed by moving the instances to other nodes of the qualifying schema.

17 Claims, 8 Drawing Sheets

FIG. 1

TABLE 1: REPRESENTATION OF QUALIFYING SCHEMAS

| SI NO | QUALIFYING SCHEMA ID | ROOT NODE NAME | REPRESENTATION | STRUCTURE CODE | LABELS AND THEIR GLOBAL NODE IDS |
|---|---|---|---|---|---|
| 1 | 1 | SCHOOL | $QS_1 = \{S_1, L_1\}$ | $S_1 = 180$ | $L_1$ = {SCHOOL, MORNING, EVENING, COURSE, RESEARCH, COURSE} GLOBAL NODE IDS = {1.1, 1.2, 1.3, 1.4, 1.5, 1.6} |
| 2 | 2 | PERSON | $QS_2 = \{S_2, L_2\}$ | $S_2 = 8$ | $L_2$ = {PERSON, STUDENT, TEACHER, EMPLOYEE} GLOBAL NODE IDS = {2.1, 2.2, 2.3, 2.4} |
| 3 | 3 | COMPANY | $QS_3 = \{S_3, L_3\}$ | $S_3 = 60$ | $L_3$ = {COMPANY, FIRSTSHIFT, SECONDSHIFT, PRODUCT, RESEARCH} GLOBAL NODE IDS = {3.1, 3.2, 3.3, 3.4, 3.5} |

FIG. 2A

TABLE 2: REPRESENTATION OF RELATIONSHIPS

| SI NO | RELATIONSHIP ID | RELATIONSHIP NAME (OPTIONAL) | COMMENTS |
|---|---|---|---|
| 1 | 1.4 - 2.2 | STUDENT | RELATIONSHIP BETWEEN NODE 4 OF QS 1 AND NODE 2 OF QS 2 |
| 2 | 1.4 - 2.3 | TEACHER | RELATIONSHIP BETWEEN NODE 4 OF QS 1 AND NODE 3 OF QS 2 |
| 3 | 1.5 - 2.2 | RESEARCH STUDENT | RELATIONSHIP BETWEEN NODE 5 OF QS 1 AND NODE 2 OF QS 2 |
| 4 | 1.5 - 2.3 | RESEARCH TEACHER | RELATIONSHIP BETWEEN NODE 5 OF QS 1 AND NODE 3 OF QS 2 |
| 5 | 1.6 - 2.2 | - | RELATIONSHIP BETWEEN NODE 6 OF QS 1 AND NODE 2 OF QS 2 |
| 6 | 1.6 - 2.3 | - | RELATIONSHIP BETWEEN NODE 6 OF QS 1 AND NODE 3 OF QS 2 |
| 7 | 2.4 - 3.4 | - | RELATIONSHIP BETWEEN NODE 4 OF QS 2 AND NODE 4 OF QS 3 |
| 8 | 2.4 - 3.5 | - | RELATIONSHIP BETWEEN NODE 4 OF QS 2 AND NODE 5 OF QS 3 |

FIG. 2B

TABLE 3: ASSOCIATING INSTANCES TO RELATIONSHIPS (INSTANCE IDS ARE QUALIFIED)

| SI NO | RELATIONSHIP ID | RELATIONSHIP NAME (OPTIONAL) | INSTANCES | COMMENTS |
|---|---|---|---|---|
| 1 | 1.4 - 2.2 | MORNING STUDENT | 1.4:CRS001, 2.2:PRS001, 2.2:PRS002 | STUDENTS PRS001 AND PRS002 TAKES MORNING COURSE CRS001 |
| 2 | 1.4 - 2.2 | MORNING STUDENT | 1.4:CRS002, 2.2:PRS003, 2.2:PRS004 | STUDENTS PRS003 AND PRS004 TAKES MORNING COURSE CRS002 |
| 3 | 1.4 - 2.3 | TEACHER | 1.4:CRS001, 2.3:PRS005 | TEACHER PRS005 TEACHES MORNING COURSE CRS001 |
| 4 | 1.4 - 2.3 | TEACHER | 1.4:CRS002, 2.3:PRS006 | TEACHER PRS006 TEACHES MORNING COURSE CRS002 |
| 5 | 1.5 - 2.2 | RESEARCH STUDENT | 1.5:RSH001, 2.2:PRS007, 2.2:PRS008 | STUDENTS PRS007 AND PRS008 WORKS IN SCHOOL RESEARCH PROJECT RSH001 |
| 6 | 1.5 - 2.3 | RESEARCH SUPERVISOR | 1.5:RSH001, 2.3:PRS009 | TEACHER PRS009 SUPERVISES SCHOOL RESEARCH PROJECT RSH001 |
| 7 | 1.6 - 2.2 | EVENING STUDENT | 1.6:CRS002, 2.2:PRS010, 2.2:PRS011 | STUDENTS PRS010 AND PRS011 TAKES EVENING COURSE CRS002 |
| 8 | 1.6 - 2.3 | EVENING TEACHER | 1.6:CRS002, 2.3:PRS012 | TEACHER PRS012 TEACHES EVENING COURSE CRS002 |
| 9 | 2.4 - 3.4 | FIRST SHIFT EMPLOYEE | 2.4:PRS013, 2.4:PRS014, 3.4:PRD001 | EMPLOYEES PRS013 AND PRS014 WORKS IN FIRSTSHIFT ON PRODUCT PRD001 |

| | | | | |
|---|---|---|---|---|
| 10 | 2.4 - 3.4 | FIRST SHIFT EMPLOYEE | 2.4:PRS015, 2.4:PRS016, 3.4:PRD002 | EMPLOYEES PRS015 AND PRS016 WORKS IN FIRSTSHIFT ON PRODUCT PRD002 |
| 11 | 2.4 - 3.5 | SECOND SHIFT EMPLOYEE | 2.4:PRS017, 2.4:PRS018, 3.5:RSH001 | EMPLOYEES PRS017 AND PRS018 WORKS IN SECONDSHIFT ON RESEARCH PROJECT RSH001 |
| 12 | 1.4 - 2.2, 1.6 - 2.2 | ALL DAY STUDENT | 1.4:CRS001, 1.6:CRS002, 2.2:PRS019, 2.2:PRS020 | STUDENTS PRS019 AND PRS020 TAKES MORNING COURSE CRS001 AND EVENING COURSE CRS002 |
| 13 | 1.5 - 2.2, 1.6 - 2.2 | RESEARCH AND EVENING STUDENT | 1.5:RSH001, 1.6:CRS002, 2.2:PRS021, 2.2:PRS022 | STUDENTS PRS021 AND PRS022 WORKS IN (MORNING) SCHOOL RESEARCH PROJECT RSH001 AND RAKES EVENING COURSE CRS002 |
| 14 | 1.5 - 2.3, 1.6 - 2.3 | RESEARCH AND EVENING TEACHER | 1.5:RSH001, 1.6:CRS002, 2.3:PRS023 | TEACHER PRS023 SUPERVISED (MORNING) SCHOOL RESEARCH PROJECT RSH001 AND TEACHES EVENING COURSE CRS002 |
| 15 | 1.6 - 2.2, 2.4 - 3.4 | WORKING STUDENT | 1.6:CRS002, 2.2#2.4:PRS024, 2.2#2.4:PRS025, 3.4:PRD001 | PERSONS PRS024 AND PRS025 WORKS IN THE FIRSTSHIFT OF THE COMPANY ON PRODUCT PRD001 AND TAKES THE EVENING COURSE CRS002 IN THE SCHOOL |
| 16 | 1.4 - 2.2, 1.5 - 2.2, 2.4 - 3.5 | SCHOOL AND COMPANY RESEARCH | 1.4:CRS002, 1.5:RSH001, 2.2#2.4:PRS026, 2.2#2.4:PRS027, 3.5:RSH001 | PERSONS PRS062 AND PRS027 TAKES MORNING COURSE CRS002, WORKS ON (MORNING) SCHOOL RESEARCH ROJECTS RSH001 AND (SECONDSHIFT) COMPANY RESEARCH PROJECT RSH001 |

REPRESENTING RELATIONSHIPS BETWEEN DATA

BACKGROUND

1. Field

The present invention relates to data storage and manipulation, and more specifically, to systems, methods and computer products for representing the relationships between data instances.

2. Description of Related Art

Computer systems have greatly enhanced our ability to store, manipulate and retrieve data of various kinds. One common tool for working with large amounts of data is the computer database. Databases organize related information by storing data records, with each data record having one or more fields of information related to the data record. The database is generally defined to be the collection of records itself containing the data. A database management system (DBMS) is used to manage, manipulate and interact with the data records of the database. Quite often, however, people refer to a database intending the term to include the DBMS as well.

There are several different types of database structures, including flat databases and relational databases that can be used to manipulate, store and report data. A flat database has data organized in a single, two-dimensional array of data elements called a table. Tables are organized in columns and rows. Some conventional databases allow the data instances to reference one another. This is done by keeping the reference of one within the other. However, this manner of referencing data instances has its disadvantages. For example, when relationships between instances are established through reference of one instance within the other, the instance schema gets tightly coupled with the relationship. Therefore, if the instance needs to remove a relationship or establish a new relationship, the instance schema needs to be updated.

What is needed is a better way to establish references between data instances.

SUMMARY

Embodiments disclosed herein address the above stated needs by providing systems, methods and computer products that provide an improved way of establishing references between data instances.

Various embodiments represent relationships for data by determining the characteristics of the data instances or expected data instances. A number of qualifying schemas may be created which are related to the characteristics of the data instances. Relationships between the qualifying schemas can be determined, with each of the relationships being given a unique label. Data instances are associated with the various qualifying schemas.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Various embodiments disclosed herein pertain to the representation of relationships between data which has several advantages over the existing system of relationships represented by relational and object databases. One core concept in these various embodiments is to have a set of qualifying schema which are labeled trees. Data instances may be associated to one or more appropriate nodes of the qualifying schema, but the data instances are not in themselves part of the qualifying schema. As such, the qualifying schema itself is not instantiated, that is, an object of a class for the schema is not created. The qualifying schema serves the dual purpose of qualifying the data instances as well as establishing relationships between them. In accordance with various embodiments data instances can be associated with a node of the qualifying schema. In a graphical implementation, this may be done by dragging a data instance and dropping it into a node. The node may be thought of as containing the data instances, although the node itself does not consist of data instances. Relationships between instances can simply be changed by moving the instances to other nodes of the qualifying schema. The various embodiments may also assign a unique relationship ID (in a format which can be compared and sorted) to each relationship between the nodes of the qualifying schema. In this way, the relationship IDs can be sorted, supporting faster querying and manipulation of the instances.

Relationships between instances are not part of the instance schema. Unlike the relationships in the relational and object databases, in accordance with various embodiments the relationships are not part of the instance schema, but rather are decoupled within a qualifying schema. Therefore, the instance schema—and thus, the instances themselves—do not change when relationships between instances change. Instead, the relationships between instances are represented by a qualifying schema which is a labeled tree and is described by the combination of its structure code and set of labels. Hence, the qualifying schema can be navigated based on structure, labels or combination of them.

The qualifying schema definition is independent of instance schema definition. The qualifying schema definition, which is a tree structure, does not depend upon instance schema definition. The association between an instance and the qualifying schema may be thought of as being logical and not physical. Therefore, the instance schema definition can have any structure and format. It is not necessary that the instances are objects. They can have any data format.

Each relationship between the qualifying schema nodes has a unique relationship identifier. The relationship identifiers can be compared and sorted. For example, two relationship identifiers can be compared to determine whether they are equal, less than or greater than each other. This allows the relationship identifiers to be sorted. The relationships between qualifying schema nodes are independent of instance schema definition. Moreover, the relationships between qualifying schema nodes are independent of instances.

Instances can be associated with qualifying schema nodes. By observing certain semantic constraints instances can be associated with any qualifying schema nodes. For example, a course data instance (e.g., for a course of study at a university) can be associated to any course (or equivalent) qualifying schema node. However, in some embodiments the constraints are not necessarily validated during association. Whether or not the constraints are validated during the association depends upon the options chosen for the particular implementation. Regarding instance qualification, in accordance with various embodiments, instances may get qualified with qualifying schema node path with which they are associated. That is, the instance gets qualified with the path of the node (from root) with which it gets associated. The path may either be expressed with node IDs or node labels. Such qualification is useful when it is required to assign a role to an instance.

As for instance association, in accordance with various embodiments, instances get associated with the relationships of the qualifying schema nodes with which they are associated. In other words, a first data instance that belongs to a first qualifying node and a second data instance that belongs to a second qualifying node becomes associated with the relationship between the first and second nodes. A qualifying schema node can be associated with multiple other qualifying schema nodes. Instances belonging to these nodes get associated with the relationships of these nodes. In this way the different instances may become related to each other. Instances can change their associations with qualifying schema nodes. For example, instances can be moved between qualifying schema nodes and change both their qualification and relationships, without changing the instance itself. Hence, relationships between instances can change without changing the instance schema.

Instances can be queried in multiple ways. For example, instances can be queried based on their qualification, their relationships or on their combination. The query string may have only structural semantics which does not reveal the labels of the qualifying schema trees.

Figure 1:
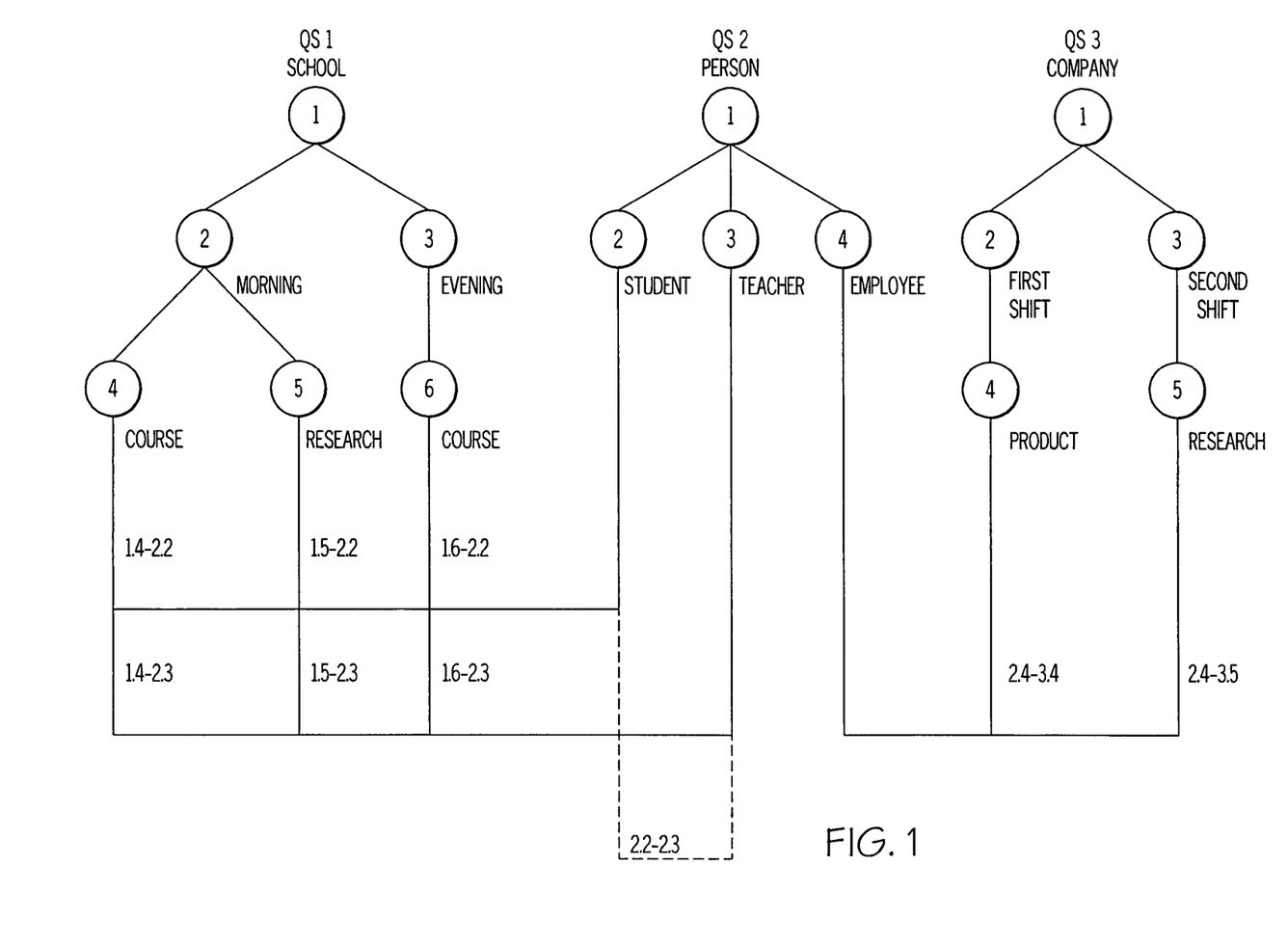
FIG. 1 depicts an exemplary tree of a qualifying schema showing its relationships and instances.

FIG. 1 depicts an exemplary tree of a qualifying schema showing its relationships and instances. In particular, FIG. 1 shows a database schema with three qualifying schemas, QS 1, QS 2 and QS 3. The three qualifying schemas in this example each have a tree structure whose root nodes are, respectively, School, Person and Company.

The real-world interpretation of the qualifying schema may be as follows: The school has a morning session and an evening session. In the morning session the school offers courses and research projects to students. In the evening session, the school offers only courses. A person can either be a student, a teacher, an employee, or some combination of these roles. The company operates two shifts, the first shift and the second shift. The first shift deals with manufacturing of products and the second shift deals with research projects.

Each database may be characterized by concepts including a qualifying schema, a qualifying schema ID, a structure code, a type of tree code, one or more labels, local node IDs, and a global node ID. Each qualifying schema is described by the structure code of its tree and the set of labels on the tree nodes. Within the entire relational schema each qualifying schema is identified by a qualifying schema ID which is an integral value. In the example of FIG. 1, the school has a qualifying schema ID 1 (e.g., QS 1), the person has a qualifying schema ID 2, and the company has a qualifying schema ID 3.

Each node of a qualifying schema tree has a local node ID which is a number equal to the order of the node during breadth-first traversal of the tree. For example, the morning node within the School has a local node ID as 2. The equivalent global node ID will be 1.2 where 1 represents the qualifying schema ID and 2 represents the local node ID. In some embodiments the nomenclature may be abbreviated by omitting intermediate local nodes. For example, node 5 (research project) may be represented as 1.5, rather than including the intermediate local Morning node (1.2.5). In this way any node can be represented by a two digit Global Node ID, in the following manner:

Global Node ID=<Qualifying Schema Id>-<LocalNodeId>

Regarding the order of global node IDs, since the local node IDs have an order, so do the global node IDs. Therefore, global node IDs can be sorted. Global node IDs are ordered as follows: First, sort the node IDs in ascending order based on qualifying schema ID. Thereafter, for nodes with the same qualifying schema ID, sort the nodes based on local node ID in ascending order. For example, if we have nodes 2.4, 3.2, 1.5, 2.3, 1.4, 3.1, first sorting the node IDs based on qualifying schema ID gives: 1.5, 1.4, 2.4, 2.3, 3.2, 3.1. Sorting the node IDs with the same qualifying schema ID based on local node IDs gives: 1.4, 1.5, 2.3, 2.4, 3.1, 3.2. For sorted global node IDs, the nodes on the left are considered to have lower values than the nodes on the right. For example 1.4<1.5, 1.4<2.1, etc.

FIG. 1 also shows the relationship IDs for each relationship. If two qualifying schemas are related (as depicted by a connection in FIG. 1) a relationship ID can be provided. For example, if at least one of the Students 2.2 attends a MorningCourse 1.4, then a connection labeled 1.4-2.2 will be shown between the MorningCourse node 1.4 and the Student node 2.2. In some situations the nodes within a same qualifying schema may be connected, that is, if there is a relationship between the nodes or between data instances associated with the nodes. For example, if a particular teacher associated with Teacher node 2.3 also happens to be taking a class as a Student 2.2, then the relationship 2.2-2.3 will be depicted (shown as a dotted line in FIG. 1 for illustrative purposes).

In regards to properties of the structure code of the qualifying schema, the structure code of the tree is so chosen that each tree node has a unique local node ID and the nodes can be ordered in breadth-first manner. (A breadth-first ordering traverses the tree nodes from left-to-right breadth-wise, and then top-to-bottom.) The structure code of a qualifying schema can be represented in any form which has the following properties:

1. The structure code should be independent of the labels of the tree.

2. The structure code should be able to identify each node of the tree as well as the order of the nodes in breadth-first order. This will support the node numbering scheme as shown in FIG. 1.

3. The structure code should allow one to find the parent-child relationships between the nodes as well as the order of the siblings.

4. The structure code should allow one to query part of the tree. There is no strict rules as to which queries should be allowed, but the more the varieties of query supported by the structure code, the more advantages one reaps from this method.

5. Tree Code is one exemplary form of the structure code. Tree Code satisfies the above conditions and also supports a rich variety of queries based on structure.

A schema can have multiple similar qualifying schemas with the same structure code and labels but they must have distinct qualifying schema IDs. The qualifying schema is not instantiated. This means that the qualifying schema does not consist of data records or object instances. For example, QS 1 of FIG. 1 is not a "School" data record or data instance. Rather, the qualifying schema nodes may contain data instances, or otherwise be associated with them. If a qualifying schema contains a data instance, then the data instance is said to belong to the qualifying schema. Qualifying schemas serve a dual purpose of qualifying the instances and associating them to relationships, but do not consist of data instances.

Figure 2A:
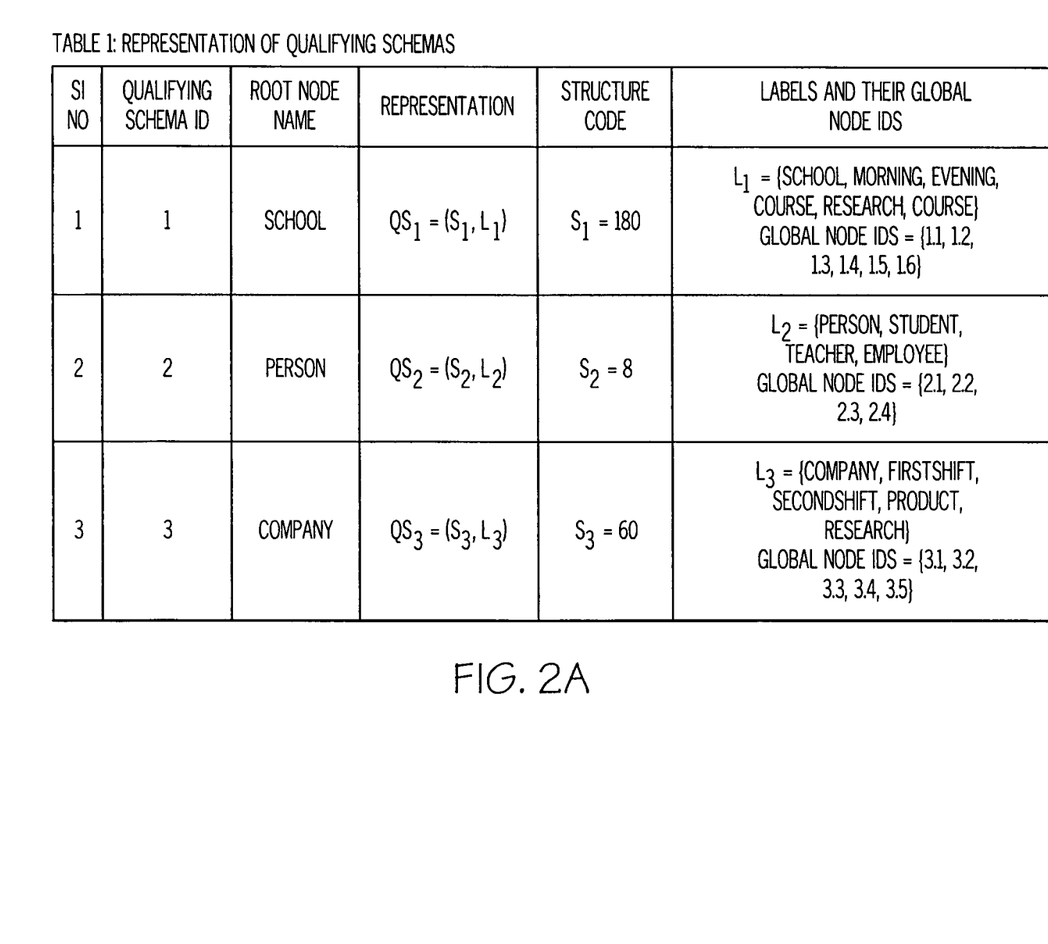
FIG. 2 depicts Table 1 and Table 2 with representations of qualifying schema and representations of relationships respectively formatted in tables.
Figure 2B:
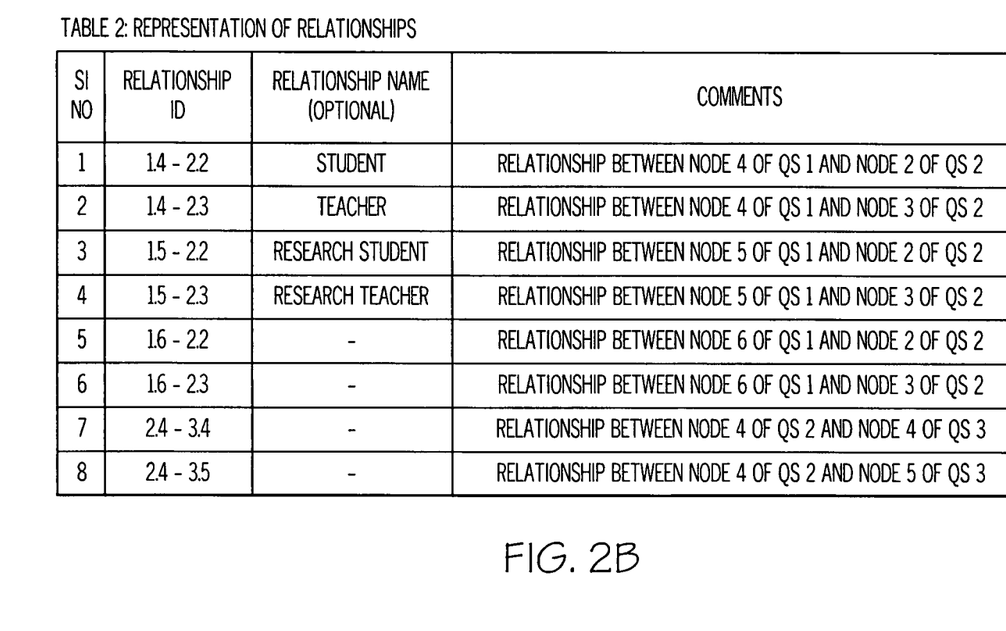

FIG. 2 depicts a representation of the qualifying schema of FIG. 1 formatted in Table 1 and a representation of relationships formatted in Table 2. In Table 1 reflects a representation of the qualifying schemas S1, but with no qualifying schema ID root. In various embodiments the structure code is obtained by following the method of computation of Tree Code or any other structured code that allows querying and/or comparing of the tree structure.

There can be a number of relationships among the qualifying schema labels of Table 1. For example, a Student can undertake Courses in the Morning and/or Evening session. These relationships are depicted in Table 2 of FIG. 2 as 1.4-2.2 and 1.6-2.2, respectively. A Student can also opt for undertaking a Research project, a relationship characterized as 1.5-2.2 in Table 2. A Teacher can teach Courses and/or supervise Research projects, as can be seen in the three entries of Table 2, 1.4-2.3 or 1.6-2.3, and 1.5-2.3. The nomenclature for a Teacher who teaches both morning Courses 1.4-2.3 and Evening Courses 1.6-2.3 may, in some embodiments, be abbreviated as 1.4#1.6-2.3. An Employee can work in either the FirstShift (2.4-3.2) or SecondShift (2.4-3.3) and be involved in the manufacture of Products (2.4-3.4) or in conducting research (2.4-3.5).

In regards to the relationship ID and Relationship order, it should be noted that the relationships are bidirectional since this method allows bidirectional queries. The relationships can be ordered in the order of relationship IDs. A relationship ID consist of the global node IDs which are involved in the relationship. The first global node ID in the relationship ID should have a lower value compared to the second global node ID. In some embodiments, the order of the relation IDs are determined as follows: 1) First sort the relationship IDs based on the first global node ID in the ascending order; and 2) Next for relationships with the same first global node IDs, sort the relationship IDs based on the second global node ID in ascending order.

For a sorted relationship ID list, the relationship IDs on the left are considered to have lower values than the relationship IDs on the right. A relationship ID uniquely identifies a relationship between any two distinct nodes within the relational schema. It is not necessarily true that all pairs of nodes in the qualifying schema have relationships between them. For example, there is not a relationship between the Employee node of QS 2 and Course node of QS 1. The designer decides which nodes will have relationships between them based on the semantic meaning of the nodes. Since an Employee is associated with a Company rather than School in real world the Employee node is related to Company tree. However, an instance of Person can belong to both the Student as well as Teacher node, as discussed in the example above and shown in FIG. 1 as 2.2-2.3.

Table 2 of FIG. 2 also depicts an exemplary representation of relationships between qualifying schema nodes. The relationships in Table 2 are sorted in the ascending order of relationship IDs. Apart from the relationship ID, a relation can be associated with any user defined relationship name, which is optional.

An important concept in conventional relational databases is the instance, along with instance IDs and Instance Schema. Instances are the actual data holders. For example, in relational databases each data record of a table is an instance (sometimes called a data instance). In object databases, each object is an instance. Each instance has a schema associated with it. In conventional relational databases, the table definition is the instance schema. In object world a class definition or an XML schema definition may serve as an instance schema. The schema associated with an instance is called an instance schema. Conventional instance schemas differ from qualifying schemas disclosed herein. A qualifying schema in accordance with the various embodiments is not instantiated, but instead serves to qualify one or more instances and associate them with relationships. Therefore, an instance schema defines instances which hold the actual data, whereas qualifying schemas hold the instances to qualify and relate them.

Each data instance is associated with an instance ID to uniquely identify that instance from other instances of the same instance schema. An instance ID is similar to a primary key in the relational database or an object identifier for an object tree. For example, the instance IDs of Course can be CRS001 and CRS002. For Course the instance schema may have attributes like CourseName, Description, etc.

An instance can be associated to a qualifying schema node which has the same semantic meaning. For example, an instance of Course CRS001 can be associated with a qualifying schema node Course. An instance can be associated with multiple qualifying schema nodes at a given time provided the association is semantically correct. There are many ways of determining, or enforcing, whether an association is semantically correct. The qualifying schema qualifies an instance depending on which qualifying schema node an instance is associated with. For example, if an instance of Person PRS001 is associated with the qualifying schema node Person, its qualified instance ID is 2.1.PRS001, where 2.1 is the global node ID of the Person node in the qualifying schema with qualifying schema ID 2. If the instance PRS001 is moved to the Employee node, its qualified instance ID becomes 2.4.PRS001. If the instance PRS001 is simultaneously associated with the two nodes Teacher and Employee, its qualified instance ID may be reflected as 2.3#2.4:PRS001.

Figure 3A:
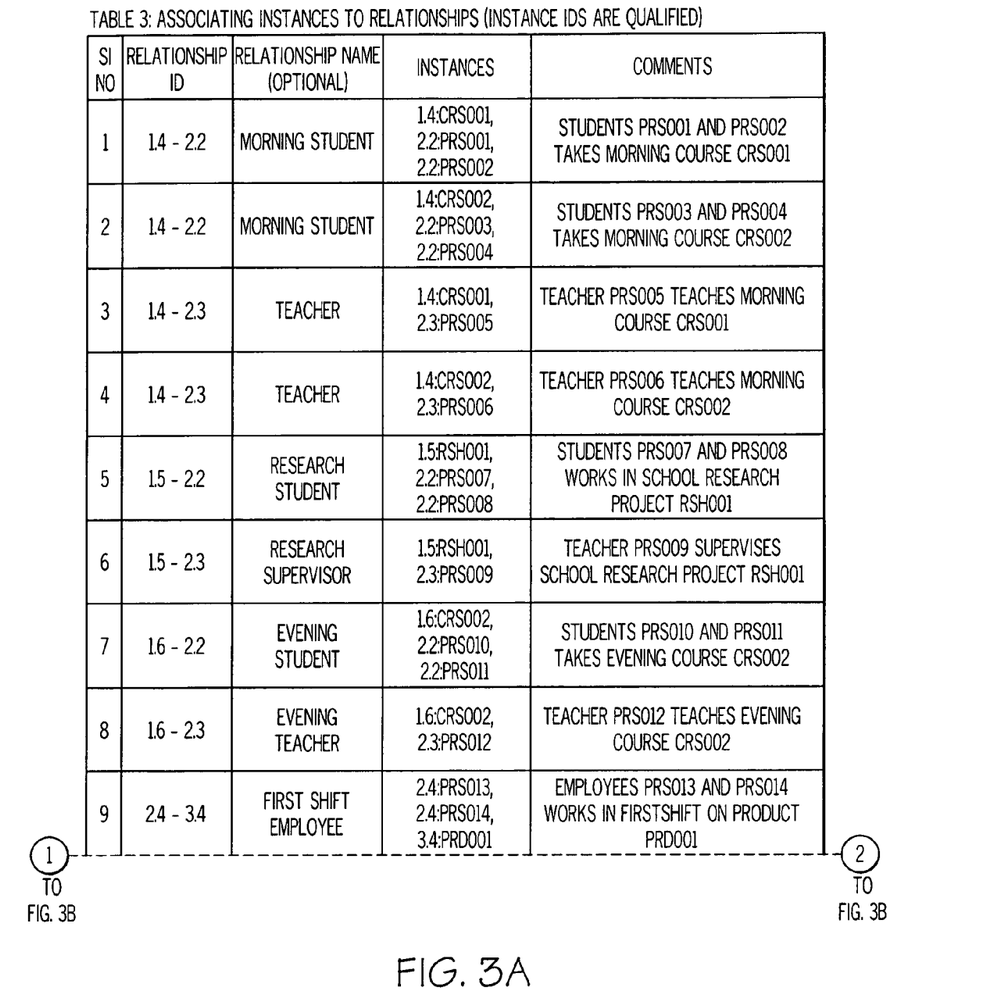
FIG. 3 depicts Table 3 with an exemplary representation of relationships between qualifying schema nodes.
Figure 3B:
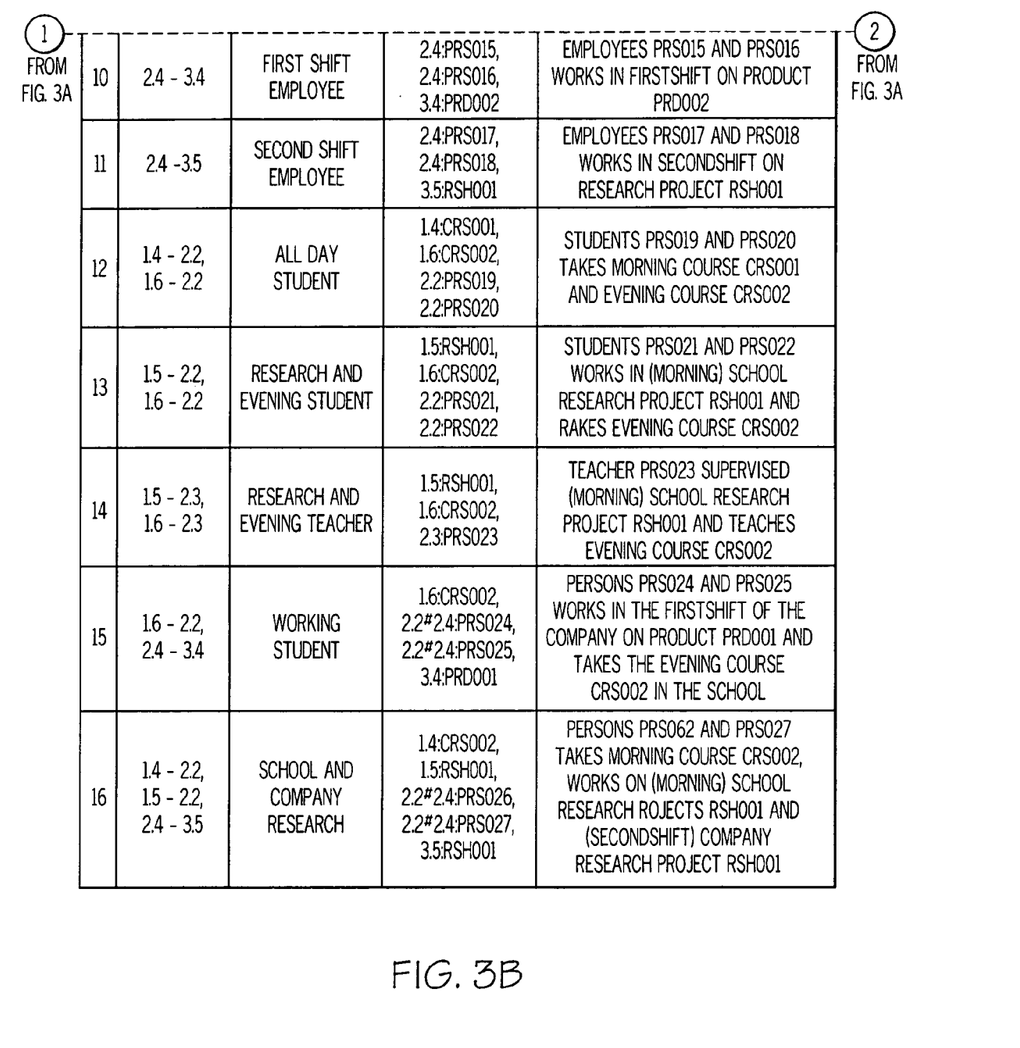

FIG. 3 depicts a representation of the association between instances and relationships, shown in table form in Table 3. The order of the rows in Table 3 follows the ascending order of Relationship IDs. For the same Relationship IDs the rows can be ordered in any manner. For rows with multiple Relationship IDs, the rows are first sorted based on the first Relationship IDs, then the second Relationship IDs and so on. The order of the instances in a particular row does not matter. The instances are qualified by the qualifying schema. All the Relationships are bidirectional since the method supports bidirectional queries. The relationships can have any cardinality including many-to-many. A single instance can be associated with multiple relationships with same or different entities. Multiple rows can have the same relationship IDs. Relationship names are optional. The user can define those for greater flexibility in querying instances based on relationship names also.

The various embodiments can support a variety of queries, including for example: Queries based on relationship IDs; Queries based on relationship IDs and instance schema names; Queries based on qualifying schema node IDs; Queries based on path; and Queries based on relationship names. Some of these exemplary queries are described in the following paragraphs.

An example of a query based on relationship IDs could be: "Find the instances associated with relationship 1.4-2.2." This query will return the instances of rows 1 and 2 of Table 3 eliminating duplications and removing qualifications. The output is: CRS001, PRS001, PRS002, CRS002, PRS003, PRS004. Another example of a query based on relationship IDs could be: "Find the instances associated with relationship 1.4-2.2, 1.5-2.2, 2.4-3.5." This query will return the instances of row 16 of Table 3. The output is: CRS002, RSH001, PRS026, PRS027, RSH001.

An example of a query based on relationship IDs and instance schema names could be: "Find the instances of 2.Student in Table 3 (2 is the qualifying instance ID) associated with relationship 1.4-2.2." The Student has the global node ID 2.2. This query will get the instances of the rows 1 and 2 (which corresponds to relationship 1.4-2.2) of Table 3 and then filter them based on their qualification 2.2. The output is: PRS001, PRS002, PRS003, PRS004.

An example of a query based on qualifying schema node IDs could be: "Find the instances associated with node 1.4." This query will first get all the instances from the rows whose relationship ID contains 1.4. Then the returned instances are filtered based on their qualification 1.4. The output is: CRS001, CRS002.

An example of a query based on path could be "Find the instances associated with QS1/School/Morning/Research." From the QS 1 tree, the global node ID corresponding to the given path is determined. The global node ID is 1.5. Thereafter the steps mentioned in query type 3 is followed. The output is: RSH001.

In conventional relational databases two object instances are related by keeping a reference of one within the other. The instance of Person relates to the instance of Course by keeping a reference of Course in it in such conventional database systems. The same is true in one-to-one and one-to-many relationships in relational databases in many cases where relationships are established through a foreign key reference in conventional databases. The present inventors recognized that this relationship may be disadvantageous since, when relationships between instances are established through reference of one instance within the other, the instance schema gets tightly coupled with the relationship. Therefore, if the instance needs to remove a relationship or establish a new relationship, the conventional instance schema needs to be updated. For example, if a course is canceled, in a conventional relational database all the instances for students which contain a reference to the canceled course must be updated. The various embodiments disclosed herein are not subject to this drawback since they do not establish relationship between two instances by keeping a reference of one instance within the other. Instead, instances are added to a qualifying schema. The qualifying schema associates the instances with relationships with other instances. In accordance with various embodiments, a canceled course may be reflected by simply deleting the qualifying schema of the course. The instances that had previously belonged to the course's qualifying schema will not themselves be changes; the will simply no longer belong to the canceled course schema.

Another disadvantage of relational database schema or object relationships is that they do not have a built-in mechanism to identify a relationship with a unique ID. For example, conventional relational databases do not have a mechanism to uniquely identify the relationship between Person and Course. If the instance IDs of the Person and Course are used, it will change from instance to instance and the identifier will not be unique. However, in accordance with the various embodiments disclosed herein the relationship between any two qualifying schema nodes uniquely with a relationship identifier.

Since relational database schema or object relationships do not have a built-in mechanism to identify a relationship with a unique ID, queries cannot be performed based on relationship ID. However, with the various embodiments disclosed herein the user has the facility to query based on relationship ID. If relationship names are present the user can also query based on the relationship names. It should be noted that SQL and object query languages use the entity names to query data. For example, to query the Persons taking Course crs: CRS001 requires one to use the entity names Person and Course in the query string. The various embodiments disclosed herein, on the other hand, give the user the advantage to query instances only based on the structural semantics. Thus, the query string does not reveal the context of the schema. The present inventors recognized that conventional relational database schema and object schema do not allow conventional relationships to be compared and sorted. However, various embodiments disclosed herein can represent a relationship with a unique relationship ID which can be compared and sorted. In accordance with the various embodiments instances are associated with the relationship IDs. Hence, searching the Relationship-Instance table based on relationship ID becomes faster due to the sorted order of the relationship IDs.

Figure 4A:
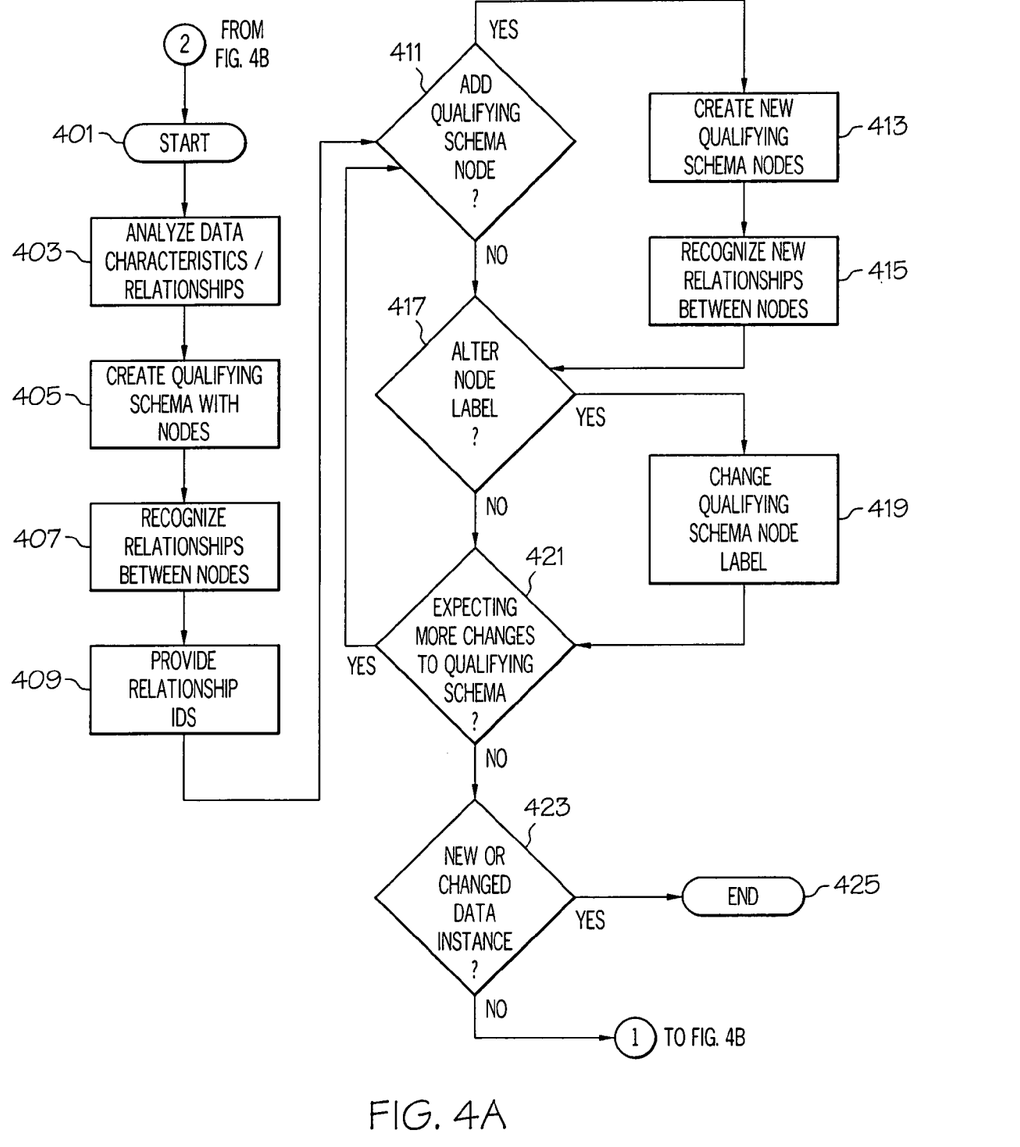
FIG. 4A is a flowchart depicting an exemplary method of creating and modifying qualifying schemas characterizing relationships between interrelated data in accordance with various embodiments of the invention.

FIG. 4A is a flowchart depicting an exemplary method of creating and modifying qualifying schemas characterizing relationships between interrelated data in accordance with various embodiments of the invention. The method of FIG. 4A results in the creation or alteration of qualifying schemas as depicted in FIG. 1, and may result in the creation or alteration of Tables 1 and/or 2 of FIG. 2. The method of FIG. 4A begins in 401 and proceeds to 403 where to analyze the data characteristics, attributes and relationships for the purpose of creating qualifying schemas and qualifying schema nodes (e.g., as shown in FIG. 1). This may involve reviewing any available data instances or expected types of data and determining what characteristics exist that can be used to create qualifying schemas, and what subcategories fall below the qualifying schemas for use as qualifying schema nodes. Take, for example, the creation of the tree depicted in FIG. 1. The activity of block 403 for this data may have entailed considering all the data instances and coming up with a qualifying schemas QS1 for School, QS2 for People, and QS 3 for Company. Further consideration of the characteristics of the data instances thought to relate to People in this example may have led to the development of subcategories for QS 2 People, namely, node 2 for Students (2.2), node 3 for Teachers (2.3), and node 4 for Employees (2.4). The qualifying schemas and nodes may be thought of as categories or containers for the data instances, but are not the data instances themselves. Once the data characteristics and relationships have been analyzed in 403 the method proceeds to 405.

In 405 the data characteristics resulting from the analysis of 403 are used in creating qualifying schema nodes. Unique names are provided for the qualifying schema nodes. For example, as discussed above, consideration of the attributes and characteristics of the QS 2 People of FIG. 1 leads to creation of the qualifying schema nodes for Students 2.2, Teachers 2.3 and Employees 2.4. The unique names selected for the qualifying schema nodes typically pertain to data characteristics or attributes that can be associated with data instances (e.g., student, teacher, employee), but may, if the user desires, take any form suitable to the user. As noted above, the qualifying schema nodes are not data instances themselves. Rather, the data instances can be associated with a qualifying schema, or with multiple qualifying schemas. For example, a given data instance (e.g., a data record for a particular person) may be put into a qualifying schema node (e.g., Students node 2.2) which results in that given data instance belonging to the node. In 405 the various qualifying schema nodes for data characteristics are determined and given unique names or labels. Once the qualifying schema nodes have been determined in 403 and listed by their unique names in 405, the method proceeds to 407.

In 407 the qualifying schema nodes and instances belonging to them are analyzed to recognize or otherwise develop relationships between them. For example, it may be determined that the qualifying schema for Employee 2.4 is associated with both qualifying schemas First-Shift Products 3.4 and Second-Shift Research 3.5, but in this set of data, the Employee 2.4 is not associated with any of the qualifying schemas stemming from School QS 1 such as the Morning Course 1.4, the Morning Research 1.5 or Evening Courses 1.6. Therefore, the relationship tree of FIG. 1 depicts relationship 2.4-3.4 between data instances belonging to Employee node 2.4 and Company First-Shift Products 3.4, and also depicts relationship 2.4-3.5 between data instances belonging to Employee node 2.4 and Company Second-Shift Research 3.5. Once the qualifying schema nodes have been analyzed and any relationships have been recognized the method proceeds from 407 to 409 to provide relationship identifications (IDs) to the recognized relationships. The relationship IDs (e.g., 2.4-3.4 2.4-3.5) are typically based upon the unique labels given to the various qualifying schema nodes back in block 405, and are therefore unique themselves. At this point a database management system of qualifying schema nodes exists. Alterations and updates to the qualifying schema nodes may be effected in accordance with the activities of the following blocks. Upon completing 409 the method proceeds to block 411.

In an existing database of previously created schema nodes changes must sometimes be made. For example, if a new data instance is added, or if an existing data instance is changed in some way, the existing schema nodes may not adequately characterize the new/changed data instance. In such situation a new qualifying schema node may be added along with new relationships to the existing schema nodes. In 411 it is determined whether or not a new qualifying schema node is to be added. If it is determined that a new qualifying schema node is to be created the method proceeds from 411 along the "YES" path to 413.

In block 413 a new qualifying schema node is created to suit the new data instance or characteristic that was changed. For example, referring to FIG. 1, it may be the case that an evening research project is to be undertaken. In this example, a new qualifying schema node 7 stemming from node 3 could be created for Evening Research (i.e., new node 1.7—not shown). Once 413 has been completed and the new qualifying schema node has been created the method proceeds to 415 to recognize any new relationships for the new qualifying schema node. This is similar to the development of relationships performed in block 407. The method then proceeds to 417. Back in block 411, if it is determined that no new node is to be added to the qualifying schema the method proceeds from 411 along the "NO" path to 417.

In 417 the system determines whether or not a node label is to be altered. To alter a node label the method proceeds from 417 along the "YES" path to 419. Once the qualifying node label has been changed in 419 the method proceeds to 421. Returning to 417, if it is determined that node qualifying node label is to be altered, the method proceeds from 417 along the "NO" path to 421. Block 421 determines whether any more changes or new nodes are expected for the qualifying schemas. If more nodes/changes are expected the method proceeds from 421 along the "YES" branch back to 411. However, if it is determined in 421 that no more data changes are expected the method proceeds from 421 along the "NO" path to 423. Block 423 determines whether or not there are to be any changes or additions to the data instances associated with the qualifying schema. If data instances changes or additions are to be made the method proceeds from 423 along the "YES" path to block 451 if FIG. 2B. However, if it is determined in 423 that no changes or additions are to be made to the data instances the method proceeds from 423 along the "NO" path and ends at 425.

Figure 4B:
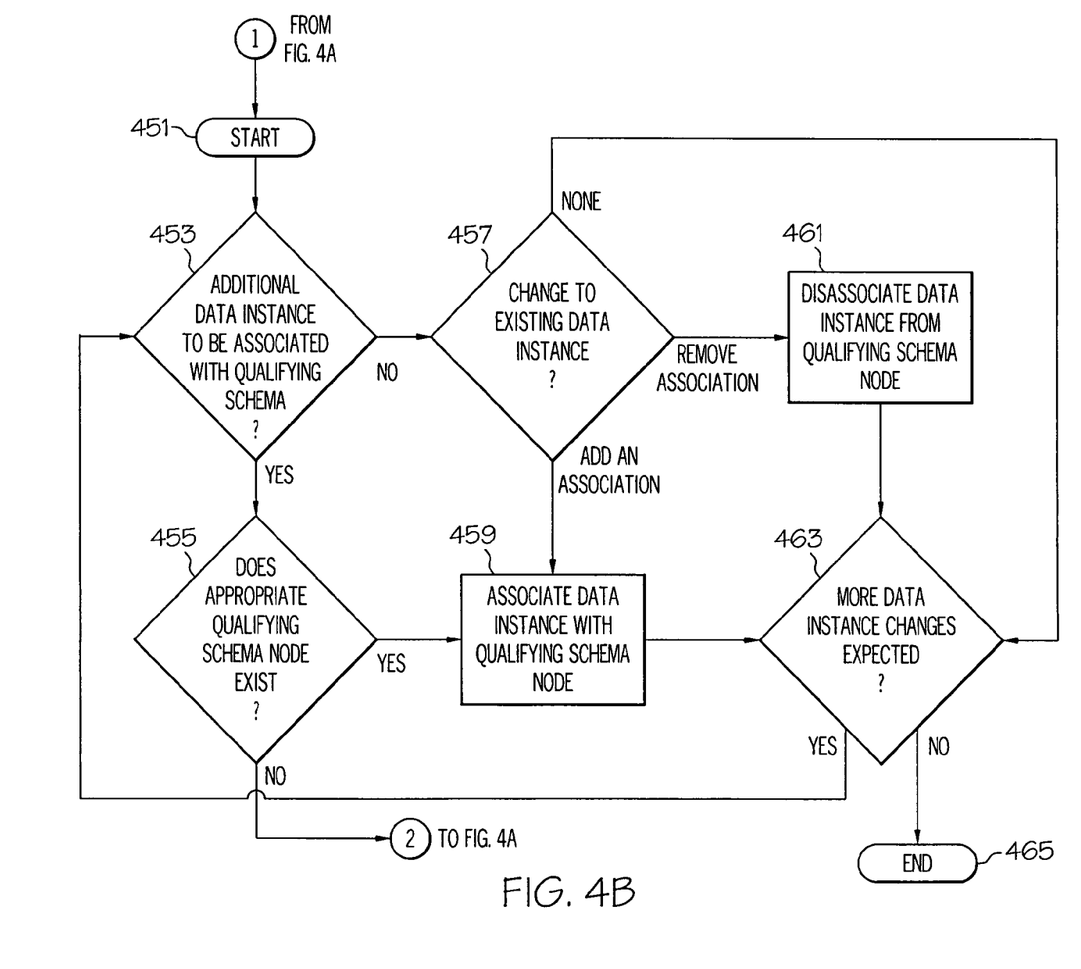
FIG. 4B is a flowchart depicting an exemplary method of associating data instances with qualifying schemas in accordance with various embodiments of the invention.

FIG. 4B is a flowchart depicting an exemplary method of associating data instances with qualifying schemas in accordance with various embodiments of the invention. The method of the FIG. 4B flowchart involves the association and/or disassociation of data instances to qualifying schemas, for example, resulting in the creation or alteration of Table 3 shown in FIG. 3. The method of FIG. 4B begins at 451 and proceeds to 453 to determine whether an additional data instance is to be associated with a node of the qualifying schema. If an additional instance is to be added the method proceeds from 453 along the "YES" path to 455 to determine whether an appropriate qualifying node exists for the data instance to be put into or other wise associated with. If it is determined that a suitable qualifying schema node does exist then the method proceeds from 455 along the "YES" path the 459 to associate the newly added data instance to the qualifying schema node deemed to be appropriate. In 459 the data instance is put into, or otherwise associated with, the appropriate qualifying schema node. An instance that has been associated with a node is said to belong to the node. An instance may belong to any number of nodes. For example, a given data instance (e.g., a data record for a particular person) may belong to the Student node 2.2, to the MorningCourse node 1.4, to the Research node 1.5, to the EveningCourse node 1.6, or any combination of these nodes. Once 459 is completed and the instance has been associated with the appropriate qualifying schema node the method proceeds from 459 to 463. Back in 455, if it is determined that no suitable qualifying schema node exists, then the method proceeds from 455 along the "NO" path back to 401 to begin the process of creating a new qualifying schema node.

Returning to block 453, if it is determined that no data instance is to be added at this time, the method proceeds from 453 along the "NO" path to 457 to determine whether any existing data instance is to be changed. If no change is to be made to any existing instance, the method proceeds from 457 along the "NONE" path to 463. A data instance may be changed by either adding or removing an association to/from a qualifying schema node. If a data instance is to be added to a qualifying schema node the method proceeds from 457 along the "Add an Association" path to 451. However, if it is determined in 457 than a data instance is to be removed from a qualifying schema node the method proceeds from 457 along the "Remove Association" path to 461. Once the data instance has been disassociated from the qualifying schema node the method proceeds from 461 to 463.

Block 463 determines whether any more data instances are to be added, or any further changes are to be made to data instances. If a data instance is expected to be added or changed the method proceeds from 463 along the "YES" path back to 453. However, if it is determined in 463 that no further data instance additions are changes are expected, then the method proceeds from 463 along the "NO" path to 465 and ends.

Figure 5:
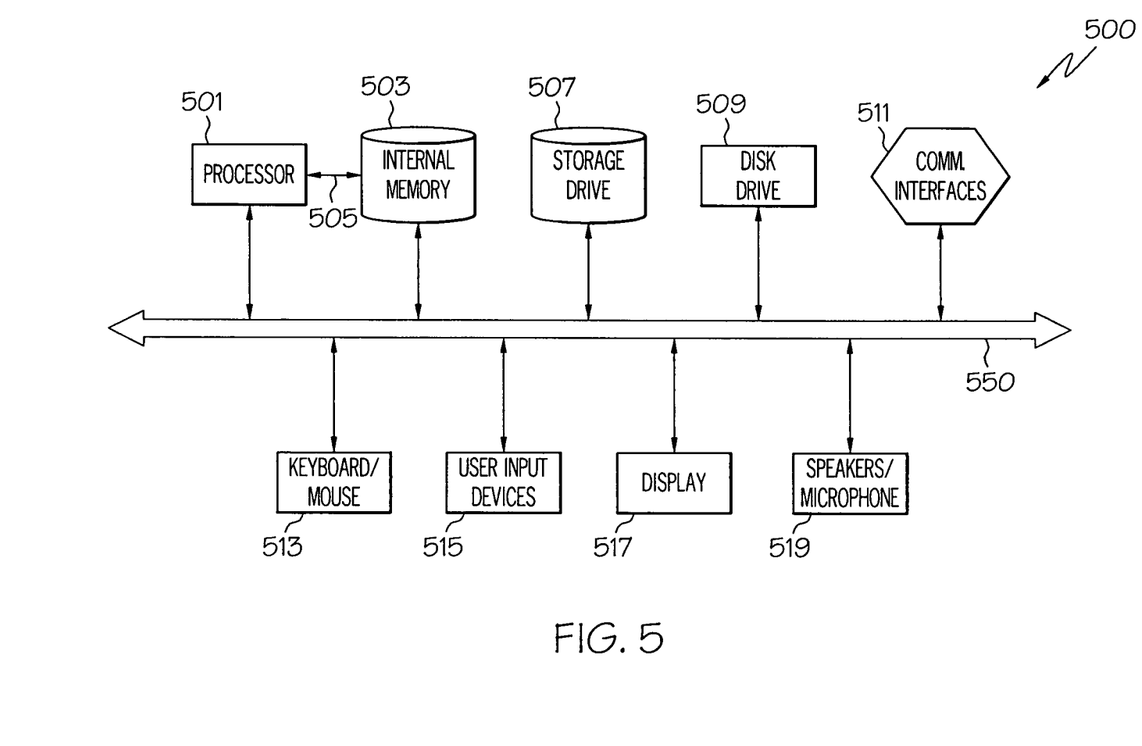
FIG. 5 depicts an exemplary computer system 500 suitable for implementing and practicing various exemplary embodiments.

FIG. 5 depicts an exemplary computer system 500 that may be used to implement various embodiments of the invention. The computer system 500 includes a processor 501 which may be embodied as a microprocessor or central processing unit (CPU). The processor 501 is typically configured to access an internal memory 503 via a bus such as the system bus 550. The internal memory 503 may include one or more of random access memory (RAM), read-only memory (ROM), cache memory, or a combination of these or other such circuitry configured to store information in a retrievable format. In some implementations the internal memory 503 may be configured as part of the processor 501, or separate from it but within the same packaging. The processor 501 may be able to access internal memory 503 via a different bus, or via control lines (e.g., local bus 505) than it uses access the other components of computer system 500.

The computer system 500 also typically includes, or has access to, one or more storage drives 507 and floppy disk drives 509. The storage drive 507 is often a hard disk drive configured for the storage and retrieval of data, computer programs or other information. The floppy disk drives 509 may include a combination of several disc drives of various formats that can read and/or write to removable machine readable medium. The machine readable medium may be any of the various available storage formats, including, for example, CD-R, CD-RW, DVD, DVD-R, floppy disk, or the like. The computer system 500 may either include the storage drives 507 and floppy disk drives 509 as part of its architecture (e.g., within the same cabinet or enclosure), as connected peripherals, or may access the storage drives 507 and floppy disk drives 509 over a network, or a combination of these. The storage drive 507 is often used to store the software, instructions and programs executed by the computer system 500.

The computer system 500 may include communication interfaces 511 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 500 may be interconnected by a bus 550 and/or may include expansion slots conforming to any of various industry standards such as PCI (Peripheral Component Interconnect), ISA (Industry Standard Architecture), or EISA (enhanced ISA).

Typically, the computer system 500 includes one or more user input/output devices such as a keyboard and/or mouse 513, or other means of controlling the cursor (e.g., touchscreen, touchpad, joystick, trackball, etc.) represented by the user input devices 515. A display 517 is also generally included as part of the computer system 500. The display 517 may be any of several types of displays, including a liquid crystal display (LCD), a cathode ray tube (CRT) monitor, a thin film transistor (TFT) array, or other type of display suitable for displaying information for the user in a human readable format—that is, visible to the human eye. The display 517 may include one or more light emitting diode (LED) indicator lights, or other such display devices. In addition, most computer systems 500 also include, or are connected to, one or more speakers 519 and microphones 521 for audio output and input. Speech recognition software may be used in conjunction with the microphones 521 to receive and interpret user speech commands.

In regards to the methods disclosed herein for practicing the various embodiments, many of the specified activities and steps may be included, or excluded, or performed in a different order than described above, with the rest of the activities still remaining within the scope of at least one exemplary embodiment. For example, block 519 may be performed after the bid time has expired as determined in block 523, in which case block 521 is performed following the new position of block 519. Other activities may either be omitted or performed in a different order than depicted in the exemplary figures included herein, and still be within the scope of the invention.

The invention may be implemented with any sort of processing units, processors and controllers (e.g., processor 501 of FIG. 5) capable of executing a program of instructions for performing the stated functions and activities. For example, the processor 501 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the internal memory 503 or storage drive 507, e.g. hard disk, CD, flash memory, ram, or other machine readable medium as recognized by one of ordinary skill in the art.

The computer software or other programs of instructions can aid or perform the steps and activities described above. For example computer programs in accordance with at least one exemplary embodiment may include: source code for the activities of the various exemplary method embodiments, including source code for determining a plurality of characteristics, wherein one or more of said plurality of characteristics describe at least one data instance; source code for creating a plurality of qualifying schemas, each of said plurality of qualifying schemas being respectively related to at least one of the plurality of characteristics; source code for determining relationships between the plurality of qualifying schemas; source code for labeling each of said relationships; and source code for associating said at least one data instance with one or more of the plurality of qualifying schemas. There are many further source codes that may be written to perform the stated steps and procedures above, and these are intended to lie within the scope of exemplary embodiments.

The invention may be implemented with any sort of processing units, processors and controllers (e.g., processor 501 of FIG. 5) capable of performing the stated functions and activities. For example, the processor 501 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the internal memory 503, storage drive 507 or disks for the disk drive 509. These include, for example, hard disks, CD, flash memory, RAM, or other computer readable medium as recognized by one of ordinary skill in the art, or the computer software programs may be transmitted wirelessly to the processing unit.

The use of the word "exemplary" in this disclosure is intended to mean that the embodiment or element so described serves as an example, instance, or illustration, and is not necessarily to be construed as preferred or advantageous over other embodiments or elements. The term data instance refers to a data point or other item of information, for example, the data that would be stored in field of a DBMS.

The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method, comprising:
   determining, via a processor of a system, a plurality of descriptive data characteristics of each of a plurality of types of data instances that are each defined by and instantiable within the system from an associated data instance schema, where the plurality of descriptive data characteristics are usable to assign information within the system to instantiated data instances of the plurality of types of data instances and to assign associations between the instantiated data instances of the plurality of types of data instances;
   creating a plurality of relationship schemas that each represent at least one of the plurality of descriptive data characteristics of each of the plurality of data types and that each decouple relationship information from and are independent of the instantiated data instances of the plurality of types of data instances and are independent of the associated data instance schemas;
   determining descriptive data characteristic relationships between the plurality of relationship schemas; and
   associating at least one data instance instantiated from the associated data instance schema with one or more of the descriptive data characteristic relationships via one or more of the plurality of relationship schemas, where the at least one data instance is movable within the system to other descriptive data characteristic relationships by re-association of the at least one data instance with other of the plurality of relationship schemas without modification of the at least one data instance or modification of the associated data instance schema.

2. The method of claim 1, further comprising:
   storing the plurality of relationship schemas and the at least one data instance in a computer readable medium; and
   displaying the plurality of relationship schemas and the at least one data instance in a human readable format.

3. The method of claim 1, where associating or disassociating the at least one data instance with one or more of the descriptive data characteristic relationships via one or more of the plurality of relationship schemas is independent of a format of the at least one data instance.

4. The method of claim 1, further comprising:
   labeling each of the plurality of relationship schemas with a unique schema identification;
   where the plurality of relationship schemas are configured in a form of a labeled tree.

5. The method of claim 1, where the plurality of relationship schemas are not instantiated.

6. The method of claim 1,
   where the plurality of relationship schemas are each defined as nodes configured to be associated with the at least one data instance without comprising the at least one data instance as part of the plurality of relationship schemas; and
   where the at least one data instance has a unique data instance identification.

7. The method of claim 1, where the at least one data instance comprises a plurality of data instances, and further comprising:
   labeling each of the descriptive data characteristic relationships with a unique relationship identification; and
   at least one of sorting and comparing the descriptive data characteristic relationships using the unique relationship identification of each of the descriptive data characteristic relationships.

8. The method of claim 7, where the descriptive data characteristic relationships represent associations between the plurality of relationship schemas, and the descriptive data characteristic relationships do not represent associations between the plurality of data instances.

9. The method of claim 1, where the at least one data instance comprises a plurality of data instances, the method further comprising:
   associating each of the plurality of data instances respectively with at least one of the plurality of relationship schemas and with any of the plurality of relationship schemas determined to have the descriptive data characteristic relationship with the at least one of the plurality of relationship schemas.

10. A computer program product comprising a tangible computer readable storage medium including a program of instructions, where the program of instructions upon being executed on a computer causes the computer to perform activities comprising:
    determining, within a system, a plurality of descriptive data characteristics of each of a plurality of types of data instances that are each defined by and instantiable within the system from an associated data instance schema, where the plurality of descriptive data characteristics are usable to assign information within the system to instantiated data instances of the plurality of types of data instances and to assign associations between the instantiated data instances of the plurality of types of data instances;
    creating a plurality of relationship schemas that each represent at least one of the plurality of descriptive data characteristics of each of the plurality of data types and that each decouple relationship information from and are independent of the instantiated data instances of the plurality of types of data instances and are independent of the associated data instance schemas;
    determining descriptive data characteristic relationships between the plurality of relationship schemas; and
    associating at least one data instance instantiated from the associated data instance schema with one or more of the descriptive data characteristic relationships via one or more of the plurality of relationship schemas, where the at least one data instance is movable within the system to other descriptive data characteristic relationships by re-association of the at least one data instance with other of the plurality of relationship schemas without modification of the at least one data instance or modification of the associated data instance schema.

11. The computer program product of claim 10, where the program of instructions upon being executed on the computer further causes the computer to perform activities comprising:
    storing the plurality of relationship schemas and the at least one data instance in the computer readable storage medium; and
    displaying the plurality of relationship schemas and the at least one data instance in a human readable format.

12. The computer program product of claim 10, where associating or disassociating the at least one data instance with one or more of the descriptive data characteristic relationships via one or more of the plurality of relationship schemas is independent of a format of the at least one data instance.

13. The computer program product of claim 10, where the program of instructions upon being executed on the computer further causes the computer to perform activities comprising:
   labeling each of the plurality of relationship schemas with a unique schema identification;
   where the plurality of relationship schemas are configured in a form of a labeled tree.

14. The computer program product of claim 10,
   where the plurality of relationship schemas are each defined as nodes configured to be associated with the at least one data instance without comprising the at least one data instance as part of the plurality of relationship schemas; and
   where the at least one data instance has a unique data instance identification.

15. The computer program product of claim 10, where the at least one data instance comprises a plurality of data instances, and where the program of instructions upon being executed on the computer further causes the computer to perform activities comprising:
   labeling each of the descriptive data characteristic relationships with a unique relationship identification; and
   at least one of sorting and comparing the descriptive data characteristic relationships using the unique relationship identification of each of the descriptive data characteristic relationships.

16. The computer program product of claim 15, where the descriptive data characteristic relationships represent associations between the plurality of relationship schemas, and the descriptive data characteristic relationships do not represent associations between the plurality of data instances.

17. The computer program product of claim 10, where the at least one data instance comprises a plurality of data instances, and where the program of instructions upon being executed on the computer further causes the computer to perform activities comprising:
   associating each of the plurality of data instances respectively with at least one of the plurality of relationship schemas and with any of the plurality of relationship schemas determined to have the descriptive data characteristic relationship with the at least one of the plurality of relationship schemas.

* * * * *